(12) United States Patent
Lin

(10) Patent No.: US 9,313,703 B2
(45) Date of Patent: *Apr. 12, 2016

(54) METHOD AND DEVICE FOR DETERMINING TARGET CELL

(71) Applicant: Huawei Technologies Co., Ltd., Shenzhen (CN)

(72) Inventor: Bo Lin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/703,264

(22) Filed: May 4, 2015

(65) Prior Publication Data

US 2015/0237546 A1   Aug. 20, 2015

Related U.S. Application Data

(63) Continuation of application No. 13/866,759, filed on Apr. 19, 2013, now Pat. No. 9,042,897, which is a continuation of application No. PCT/CN2011/081057, filed on Oct. 20, 2011.

(30) Foreign Application Priority Data

Oct. 20, 2010   (CN) .......................... 2010 1 0516031

(51) Int. Cl.
*H04W 36/00* (2009.01)
*H04W 36/08* (2009.01)

(52) U.S. Cl.
CPC .......... *H04W 36/0083* (2013.01); *H04W 36/08* (2013.01)

(58) Field of Classification Search
CPC .......................... H04W 36/0083; H04W 36/08
See application file for complete search history.

(56) References Cited

U.S. PATENT DOCUMENTS

| 7,561,068 B1 | 7/2009 | Denker et al. |
| 9,042,897 B2 * | 5/2015 | Lin ................... H04W 36/0083 370/332 |

(Continued)

FOREIGN PATENT DOCUMENTS

| CN | 1533211 A | 9/2004 |
| CN | 1929423 A | 3/2007 |

(Continued)

OTHER PUBLICATIONS

Huawei, "Rapid HO" Agenda Item 16.1, 3GPP TSG-RAN WG3 #69, Madrid, Spain, Aug. 23-27, 2010, R3-102058, 6 pages.

(Continued)

*Primary Examiner* — Kashif Siddiqui
(74) *Attorney, Agent, or Firm* — Brinks Gilson & Lione

(57) ABSTRACT

Embodiments of the present invention disclose a method and a device for determining a target cell. The method includes: acquiring information about a candidate cell for a mobile terminal; and determining the candidate cell as a target cell for the mobile terminal if the candidate cell is a preferred cell determined according to cell statistic information, where the cell statistic information includes: specific information about a cell having served the mobile terminal and specific information about the mobile terminal in the cell having served the mobile terminal. According to the solutions provided in the embodiments of the present invention, a proper target cell may be determined for a mobile terminal, thereby avoiding a large number of handovers and reselections and saving network resources.

17 Claims, 8 Drawing Sheets

Acquire information about a candidate cell for a mobile terminal — 101

Determine the candidate cell as a target cell for the mobile terminal if the candidate cell is a preferred cell determined according to cell statistic information — 102

(56) References Cited

U.S. PATENT DOCUMENTS

| | | |
|---|---|---|
| 2003/0190916 A1 | 10/2003 | Celedon et al. |
| 2004/0185851 A1 | 9/2004 | Nagai |
| 2006/0234701 A1 | 10/2006 | Wang et al. |
| 2007/0066304 A1 | 3/2007 | Lee |
| 2008/0130585 A1 | 6/2008 | Park et al. |
| 2008/0170543 A1 | 7/2008 | Rossetti et al. |
| 2009/0022106 A1 | 1/2009 | Ue et al. |
| 2009/0275334 A1 | 11/2009 | Xie et al. |
| 2010/0142486 A1* | 6/2010 | Wahlqvist ......... H04W 36/0005 370/332 |
| 2010/0291931 A1 | 11/2010 | Suemitsu et al. |
| 2011/0034196 A1 | 2/2011 | Jonishi et al. |

FOREIGN PATENT DOCUMENTS

| | | |
|---|---|---|
| CN | 101184331 A | 5/2008 |
| CN | 101631366 A | 1/2010 |
| EP | 0 701 382 A1 | 3/1996 |
| EP | 1 460 874 A2 | 9/2004 |
| EP | 1 876 767 A1 | 1/2008 |
| EP | 2 214 439 A1 | 8/2010 |
| EP | 2 466 952 A1 | 6/2012 |
| JP | 2002-027522 A | 1/2002 |
| JP | EP 1460874 A2 * | 9/2004 .......... H04W 36/245 |
| JP | 2009-206621 A | 9/2009 |
| JP | 2010-516217 A | 5/2010 |
| JP | 2010-517341 A | 5/2010 |
| JP | 2011-035743 A | 2/2011 |
| JP | 2011-087294 A | 4/2011 |
| WO | WO 2008/085838 A1 | 7/2008 |
| WO | WO 2008/133566 A1 | 11/2008 |
| WO | WO 2009/057544 A1 | 5/2009 |

OTHER PUBLICATIONS

LTE, "3rd Generation Partnership Project; Technical Specification Group Radio Access Network; Evolved Universal Terrestrial Radio Access (E-UTRA) and Evolved Universal Terrestrial Radio Access Network (E-UTRAN);Overall description; Stage 2" (Release 9), 3GPP TS 36.300, V9.5.0, Sep. 2010, 173 pages.

* cited by examiner

METHOD AND DEVICE FOR DETERMINING TARGET CELL

CROSS-REFERENCE TO RELATED APPLICATIONS

This application is a continuation of U.S. patent application Ser. No. 13/866,759, filed on Apr. 19, 2013, which is a continuation of International Application No. PCT/CN2011/081057, filed on Oct. 20, 2011. The International Application claims priority to Chinese Patent Application No. 201010516031.4, filed on Oct. 20, 2010. The afore-mentioned patent applications are hereby incorporated by reference in their entireties.

TECHNICAL FIELD

Embodiments of the present invention relate to the field of communications technologies, and in particular, to a method and a device for determining a target cell.

BACKGROUND

In the prior art, to further accommodate performance requirements of a wireless communication network, base stations having different transmit power or using different access types are deployed in the same geographic region to form heterogeneous multi-layer coverage. For example, in a long term evolution (Long Term Evolution, hereafter abbreviated as LTE) system, a heterogeneous network formed by a micro base station and a low-power base station (or referred to as a low-power node) may be used to enhance coverage of hotspots, coverage in blind spots, or coverage in weak signal spots within coverage of the macro base station, and coverage of edges of a cell of the macro base station, and meanwhile improve average throughput, edge throughput, and uplink/downlink spectrum utilization of a cell, and reduce the network construction cost and capital expenditure (Capital Expenditure, hereafter abbreviated as CAPEX) of an operator.

In an existing network, the case that a user is handed over to a cell and quickly handed over back to the original cell at the border of a macro cell exists. Such frequent handovers cause poor user experience. However, when a large number of low-power nodes are deployed within the coverage of a macro base station to obtain gains, a large number of cells are introduced. This causes a large number of cell borders. In addition, the low-power nodes have a small coverage radius, and once a user equipment moves across a border of a cell, a handover, cell selection, or cell reselection may occur so that the problem of quick handovers becomes more serious. In addition, a low-power node may function as an independent base station. This means that the handover between low-power nodes or between a low-power node and another node is a handover between base stations. However, the handover between base stations is more complicated than a handover within a base station, and involves a large amount of signaling and a plurality of network elements.

During implementation of the present invention, the inventor finds that in the prior art, the introduction of low-power nodes causes a number of "pico cells", equivalent to causing more mobility borders, and therefore causing more handovers and cell reselections. This brings a huge load to the network, and also causes more frequent service interruptions, resulting in poor user experience. In another aspect, the low-power nodes are generally deployed in hotspots, for offloading traffic, and providing better user experience for users. However, the network cannot determine which cells are frequently accessed by mobile terminals, for example, a cell covering offices, and therefore fails to effectively hand over the mobile terminals thereto.

SUMMARY

Embodiments of the present invention provide a method and a device for determining a target cell, for solving the problem of selecting a target cell among a plurality of cells after a large number of low-power nodes are introduced.

In one aspect, an embodiment of the present invention provides a method for determining a target cell, including:

acquiring information about a candidate cell for a mobile terminal; and determining the candidate cell as a target cell for the mobile terminal if the candidate cell is a preferred cell determined according to cell statistic information, where the cell statistic information includes: specific information about a cell having served the mobile terminal and specific information about the mobile terminal in the cell having served the mobile terminal.

In another aspect, an embodiment of the present invention provides a mobile terminal, including:

an acquiring module, configured to acquire information about a candidate cell;

a determining module, configured to determine the candidate cell as a target cell if the candidate cell acquired by the acquiring module is a preferred cell determined according to cell statistic information, where the cell statistic information includes: specific information about a cell having served the mobile terminal and specific information about the mobile terminal in the cell having served the mobile terminal.

In still another aspect, an embodiment of the present invention provides a network side device, including:

an acquiring module, configured to acquire information about a candidate cell for a mobile terminal;

a determining module, configured to determine the candidate cell as a target cell for the mobile terminal if the candidate cell acquired by the acquiring module is a preferred cell determined according to cell statistic information, where the cell statistic information includes: specific information about a cell having served the mobile terminal and specific information about the mobile terminal in the cell having served the mobile terminal.

The method and device for determining a target cell according to the embodiments of the present invention are capable of acquiring information about a candidate cell for a mobile terminal, determining whether the candidate cell is a preferred cell determined by the mobile terminal according to cell statistic information, and if so, determining the candidate cell as a target cell for the mobile terminal, where the cell statistic information includes specific information about the cell having served the mobile terminal, and specific information about the mobile terminal in the cell having served the mobile terminal. The method for determining a target cell according to the cell statistic information effectively prevents the mobile terminal from being blindly handed over or reselected to any candidate cell, thereby saving network resources and additionally providing more stable and reliable services for users.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
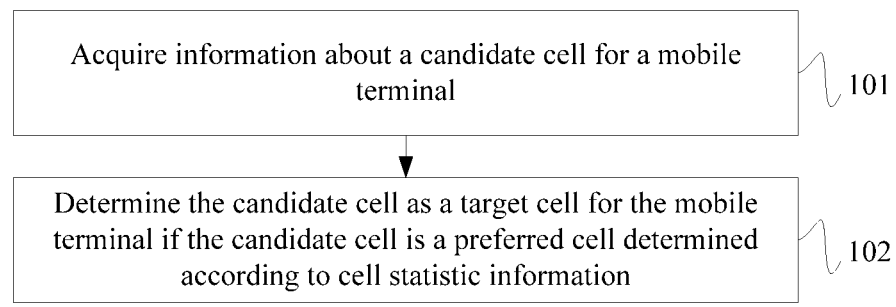
FIG. 1 is a flowchart of a method for determining a target cell according to a first embodiment of the present invention.

FIG. 1 is a flowchart of a method for determining a target cell according to an embodiment of the present invention. As shown in FIG. 1, the method includes:

Step 101: Acquire information about a candidate cell for a mobile terminal.

The mobile terminal may be a user equipment (User Equipment, hereafter abbreviated as UE), a mobile relay, and the like. The UE may be a mobile phone, a personal computer, and the like. This embodiment uses a UE as an example for description, but is not intended to limit the protection scope of the mobile terminal. The UE, during movement, may enter the coverage area of at least one or more cells, and may use at least one cell as a candidate cell of a target cell and acquire information about the cell.

Acquiring information about the candidate cell specifically refers to acquiring information about the candidate cell for differentiating the candidate cell from other cells, that is, information capable of uniquely identifying the candidate cell, for example, a cell identifier of the candidate cell.

Further, candidate cells may be categorized into different types according to the acquired information about the candidate cells. With regard to different types of candidate cells, the subsequent processing may vary. Under a circumstance, the candidate cells may be categorized into two types: cells recorded in cell statistic information and cells not recorded in cell statistic information.

The cell statistic information (Cell Statistic Information, hereafter abbreviated as CSI) may include: specific information about a cell having served the UE (hereafter referred to as cell-specific information) and specific information about the UE in the cell having served the UE (hereafter referred to as UE-specific information).

The cell-specific information refers to information about the cell in system broadcast of the cell. With regard to an LTE system, the cell-specific information mainly comes from a master information block (Master Information Block, hereafter abbreviated as MIB), a system information block (System Information Block, hereafter abbreviated as SIB), and the like. The UE-specific information refers to information about the UE dwelling in a serving cell, that is, information about the UE after the UE is associated with a specific cell, which may be specifically indicated by access information, a service feature, a behavior feature, connection quality, and the like. The CSI may be acquired by the UE, or acquired by a network side device.

With regard to a cell recorded in the CSI, whether the cell is a current target cell may be determined according to the method provided in the embodiments of the present invention. With regard to a cell not recorded in the CSI, the cell may be processed according to other conventional methods or procedures, and recorded in the CSI as a serving cell for the UE in the case that related conditions are satisfied, and whether the cell is a current target cell is determined according to the method provided in the embodiments of the present invention.

Step 102: If the candidate cell is a preferred cell determined according to the CSI, determine the candidate cell as a target cell for the UE.

Specifically, the UE-specific information may include but is not limited to one or more pieces of the following information: dwell time of the UE in the serving cell, handover result information, information about the cell desired for access, service experience, radio channel quality, access time, direction, speed, UE-specific subscriber profile identifier (Subscriber Profile Identifier, hereafter abbreviated as SPID), and the like. For detailed description of the parameters, reference may be made to Table 1 following this embodiment. It should be noted that the UE-specific information is not limited to the parameters listed in Table 1. As long as the information about the UE shows regularity and repetitiveness in a specific cell, the information about the UE can serve as UE-specific information and prior information for the subsequent processing.

The cell-specific information may include but is not limited to one or more pieces of the following information: cell identifier, a cell type, radio access (Radio Access Technology, hereafter abbreviated as RAT) information, frequency information, frequency priority information, network planning (for example, public land mobile-communication network (Public Land Mobile-communication Network, hereafter abbreviated as PLMN) identifier, a location area identifier related parameter, cell transmit power, cell location information, radio access system information, and the like. These parameters may be read from broadcast information of a cell. For example, tracking area code (Track Area Code, hereafter abbreviated as TAC), cell identifier and the like may be acquired from SIB 1 in an LTE system. For example, reference signal power (referenceSignalPower) may be acquired from SIB 2 in an LTE system to serve as base station transmit power, and hence the cell type and the like may be obtained. Additionally, it should be noted that the cell-specific information is not limited to the above parameters. As long as the information about the cell shows regularity and repetitiveness, the information about the cell can serve as cell-specific information and prior information for the subsequent processing. The cell-specific information may also be parameters in each SIB, or may be parameters (for example, multimedia broadcast multicast service over a single frequency network area configuration information (MBSFNAreaConfiguration-r9)) in a multimedia broadcast multicast service control channel (hereafter abbreviated as MCCH). The cell-specific information may also be information about the cell detected or calculated by a UE, for example, cell geographic location information, and the geographic location of a cell that can be acquired by using a global positioning system (Global Positioning System, hereafter abbreviated as GPS), cell location technology, and the like. Because the CSI is capable of reflecting regular and repetitive movement of a UE, the selection of the target cell for the UE may be optimized according to the CSI. For detailed explanation of the parameters, reference may be made to Table 2 following this embodiment. It should be noted that the cell-specific information is not limited to the parameters listed in Table 2.

TABLE 1

| UE-specific information | Remarks |
| --- | --- |
| Dwell time | Dwell time is a statistical value of the access time of a UE in a specific cell, reflecting a relative or absolute duration when the UE dwells in the cell within a period of time. The dwell time may be a statistical duration calculated from the time when the UE enters the cell to the time when the UE leaves the cell. Entering and leaving may be triggered by a cell reselection or handover. The dwell time may also be a total statistical value of dwell time of the UE within a period of time (for example, one day). The dwell time may be in a plurality of forms. For example, with regard to a UE in an idle state, the dwell time may be calculated from the time when the UE camps on the cell to the time when the UE camps on another cell due to a cell reselection. The dwell time may be in a form of cell ranking, dwell time percentage, dwell time length category indication (for example, long-time dwell, medium-time dwell, short-time dwell, ultra-short-time dwell, or time unit. The dwell time length category may be calculated using a specific algorithm. For example, dwelling of the UE in a cell once for more than two hours in a cell is regarded as a long-time dwell, dwelling for more than thirty minutes but less than two hours is regarded as a medium-time dwell, dwelling for more than five minutes but less than thirty minutes is regarded as a short-time dwell, and dwelling for less than five minutes is regarded as a quick pass-through or an ultra-short dwell. Alternatively, dwelling of the UE within one day for more than four hours is regarded as a long time dwell; dwelling for two to four hours is regarded as a medium-time dwell, dwelling for one to two hours is regarded as a short-time dwell, dwelling within one hour is regarded as an ultra-short-time dwell, and the like. |
| Handover result information | Handover result information may be a handover success rate, a handover failure rate, a too-early handover rate, a too-late handover rate, and timely handover rate related to a cell. The handover result information reflects a previous or historical empirical statistical value in the cell in an incoming or outgoing handover. It should be noted that this information is collected only in the active state. |
| Information about the cell desired for access | The information is a comprehensive assessment made by a UE or network side device based on the CSI. The information may be differentiated using different levels, or the information may be whether the cell is desired for access. During a cell reselection and handover, the cell desired for access is preferentially selected as a target cell. |
| Service experience | Service experience refers to the experience of a UE when the UE is served by the cell. This information is reflected by a bit error rate, packet error rate, radio link failure times or rate, call drop rate, and service experience, or is calculated using these parameters. |
| Access time | Time when the cell is approximately regularly accessed. |
| Direction | Direction of entering the cell when the cell is accessed, which may be represented in the form of a cell linked list. |
| Speed | Speed information when a UE accesses the cell. The UE side may calculate a traveled distance by positioning, and divide the calculated distance by the access time to obtain an approximate speed; or estimate the speed according to the number of cells accessed by the UE within a specific period of time. |

TABLE 1-continued

| UE-specific information | Remarks |
| --- | --- |
| UE-specific SPID information | SPID information is a UE-specific attribute set by an operator, which is mainly used to differentiate operation policy control for a UE. For example, if the SPID of a UE is equal to 256, with regard to the UE, the LTE network enjoys a top priority, the universal mobile telecommunications system (Universal Mobile Telecommunications System, hereafter abbreviated as UMTS) has a higher priority, and the GSM/EDGE radio access network (GSM/EDGE Radio Access Network, hereafter abbreviated as GERAN) has a lowest priority. After the UE stores the SPIDi, even if a radio resource control (Radio Resource Control, hereafter abbreviated as RRC) connection is not initiated, the UE can still know which network to preferentially camp on (the UE preferentially camps on the LTE network), so that the operator can implement differentiation of camping control of the UE in an idle state, thereby efficiently using network resources. |

TABLE 2

| Cell-specific information | Remarks |
| --- | --- |
| Cell identifier | A cell identifier is used to identify a cell, which, in an LTE system, may be a PCI or ECGI. In addition, the sequence of the cells in the movement track may be recorded in the form of a linked list. In this way, the sequence or neighboring relationship of the cells crossed by the UE may be described. During use, a next cell identifier may be acquired according to the previous cell identifier and the current cell identifier. In this way, handover preparation is made in advance. For example, if the cell linked list is . . . -A-B-C- . . . , when a target base station receives a handover request of a UE from a source base station, a source cell identifier A is obtained, and a current serving cell B is obtained after the target base station completes the handover of the UE. In this way, the current base station (the original target base station) may acquire a next target cell C according to the cell identifiers A and B and the previous cell identifier list. One cell identifier may also be associated with another cell identifier, for example, the identifier of a cell within the same coverage of a macro network at the location of the cell of the current low-power node. Using this information, when entering the macro cell, a mobile terminal may know that it will approach the corresponding low-power node. |
| Cell type | The cell type indicates a macro network or a low-power node; a relay (Relay), Pico or an H(e)NB; and is used to identify a base station type and facilitate use of different measurement or handover policies. For example: (1) Using different measurement trigger time: With regard to a low-power node, a UE can implement measurement reporting using a shorter trigger time after a measurement threshold is satisfied. This is because the low-power node has a limited coverage area, if the trigger time is long, the probability of cell handover failures may be increased. With regard to a macro network, after the measurement threshold is satisfied, measurement may be reported using a longer trigger time to reduce the probability of ping-pong handovers. (2) Acquiring architectures of different target networks: During a handover, if the current base station is a macro base station and it is acquired that the type of a target cell is H(e)NB, a handover procedure from a macro network to an H(e)NB is adopted. If the target cell is also a macro base station, a handover procedure between macro base stations is adopted. |
| RAT, frequency information, or frequency priority information | A serving base station may acquire in advance the identifier of a next target cell according to a cell identifier linked list, and may acquire the RAT or frequency of a next target cell according to this parameter. Therefore, during configuration of measurement control for a UE for a next handover, the serving base station configures the RAT or frequency to the UE. In this way, the UE will measure the RAT or frequency of the cell, which quickens the measurement process, and enables better-directed RAT or frequency measurement, especially when the RAT or frequency is different from that of the current serving cell. Similarly, 3gpp and Non-3gpp information may be subject to the same. For example, in a scenario where a wireless local area network (Wireless Local Area Network, hereafter abbreviated as WLAN) or worldwide interoperability for microwave access (Worldwide Interoperability for Microwave Access, hereafter abbreviated as Wimax), and LTE, 2G, or 3G are jointly deployed, the WLAN or WiMax may provide high-speed data services. When a UE enters an area (for example, an indoor environment such as homes and offices) where the WLAN or WiMax network is deployed and the UE dwells for a long period of time, the services may be migrated to the WLAN or WiMax to obtain better service experience. This may also help offload a part of data services for an operator and reduce congestion on an LTE, 2G, or 3G network. However, if the UE only passes through the area with WLAN or WiMax coverage temporarily, for example, in the case of home signal leakage, the services of the UE should not be migrated to the WLAN because the UE may leave the area immediately. Therefore, the UE records the cell identifier of an LTE cell neighboring to the WLAN or WiMax network covering the area where the UE dwells for a long period of time, or records the geographic location area information of the WLAN or WiMax network. When the UE enters the area for a long-time dwell again (by comparing whether the geographic locations before and after reentry into the area are the same), the UE may initiate an indication to a base station in the LTE, 2G, or 3G network by using signaling to trigger the 2G, 3G, or LTE base station to migrate the services to the WLAN or WiMax network. In this way, user experience is enhanced, and more 2G, 3G, or LTE network resources are saved, and system capacity is improved. This method may be further applicable between other access modes and access systems, which is not further detailed herein. |
| Network planning related parameter | Tracking area identifier (Track Area Identifier, hereafter abbreviated as TAI) and public land mobile communication network (Public Land Mobile-communication Network, hereafter abbreviated as PLMN) ID list. |
| Base station transmit frequency | According to transmit power information (which may be a specific value or power level information) of a base station, decision conditions for a cell reselection and/or handover are adjusted or a measurement value is increased or reduced by an offset value so that cells of some base stations are more readily to be accessed by a UE or less readily for the UE to leave. In this way, the cell reselection and/or handover is optimized. For example, when a UE in an idle state approaches a base station having low transmit power, the UE preferentially reselects a low-power node, which may be specifically implemented by adding an offset to a measurement value of the low-power node cell; when the UE leaves the low-power node, a reverse offset is added so that the low-power node is not readily for the UE to leave. |

TABLE 2-continued

| Cell-specific information | Remarks |
|---|---|
| | Similarly, with regard to a UE in an active state, a measurement value of the low-power node cell in a measurement report is increased or reduced by an offset, so that the UE is preferentially handed over to the low-power node or the UE is less readily handed over from the low-power node. For a UE in an active state, transmit power information of the base station may be reported by the UE to the base station. During a handover decision process, the base station uses the power information as an input condition for optimizing the handover. For example, the UE indicates that a target base station is a low-power node, and the source base station preferentially hands over the UE to a cell of the low-power node. This mechanism expands the coverage range of the low-power node. Accordingly, more UEs are served by the low-power node, and the macro network can provide more resources for other UEs. Finally, the system capacity is improved. |
| Cell location information | Geographic location information of a cell may be specifically obtained by detection and calculation by a UE based on the global positioning system or cell location technology. For example, cell-level positioning can be implemented by using a cell identifier in a macro network having the same coverage location, and positioning is implemented from perspectives of longitude and latitude by using the GPS. After the UE stores the geographic location information of a cell, when the UE enters the neighborhood of the location, cell reselection and/or handover optimization based on the UE-specific information and/or the cell-specific information according to the embodiment of the present invention is initiated in advance for the cell. For example, once a UE in an idle state finds that it has entered the neighborhood of a cell allowing a long-time dwell and/or having low power, the UE starts to detect the cell, and adds an offset according to the low-power node so that the UE camps on the cell in advance. Still for example, once a UE in an active state finds that it has entered the neighborhood of a cell allowing a long-time dwell and/or having low power, the UE initiates an indication to notify the network that the UE is approaching the cell and may carry CSI (for example, frequency information, cell identifier information, or low power indication information of the CSI information) to the network so that a handover of the UE to the cell is triggered. Specifically, a measurement control for the cell is delivered, and a handover process is initiated. During this process, the CSI information may be reported to the network for one or multiple times to facilitate handover optimization by the base station. |

The method for determining a target cell according to this embodiment is capable of acquiring information about a candidate cell for a mobile terminal, determining whether the candidate cell is a preferred cell determined according to cell statistic information, and if so, determining the candidate cell as a target cell for the mobile terminal, where the cell statistic information includes specific information about the cell having served the mobile terminal, and specific information about the mobile terminal in the cell having served the mobile terminal. The method for determining a target cell according to the cell statistic information effectively prevents the mobile terminal from being blindly handed over or reselected to any candidate cell, thereby saving network resources and additionally providing more stable and reliable services for users. Especially for delay-sensitive services, the speed of the UE reselection or UE handover to a desired cell is improved.

Figure 2:
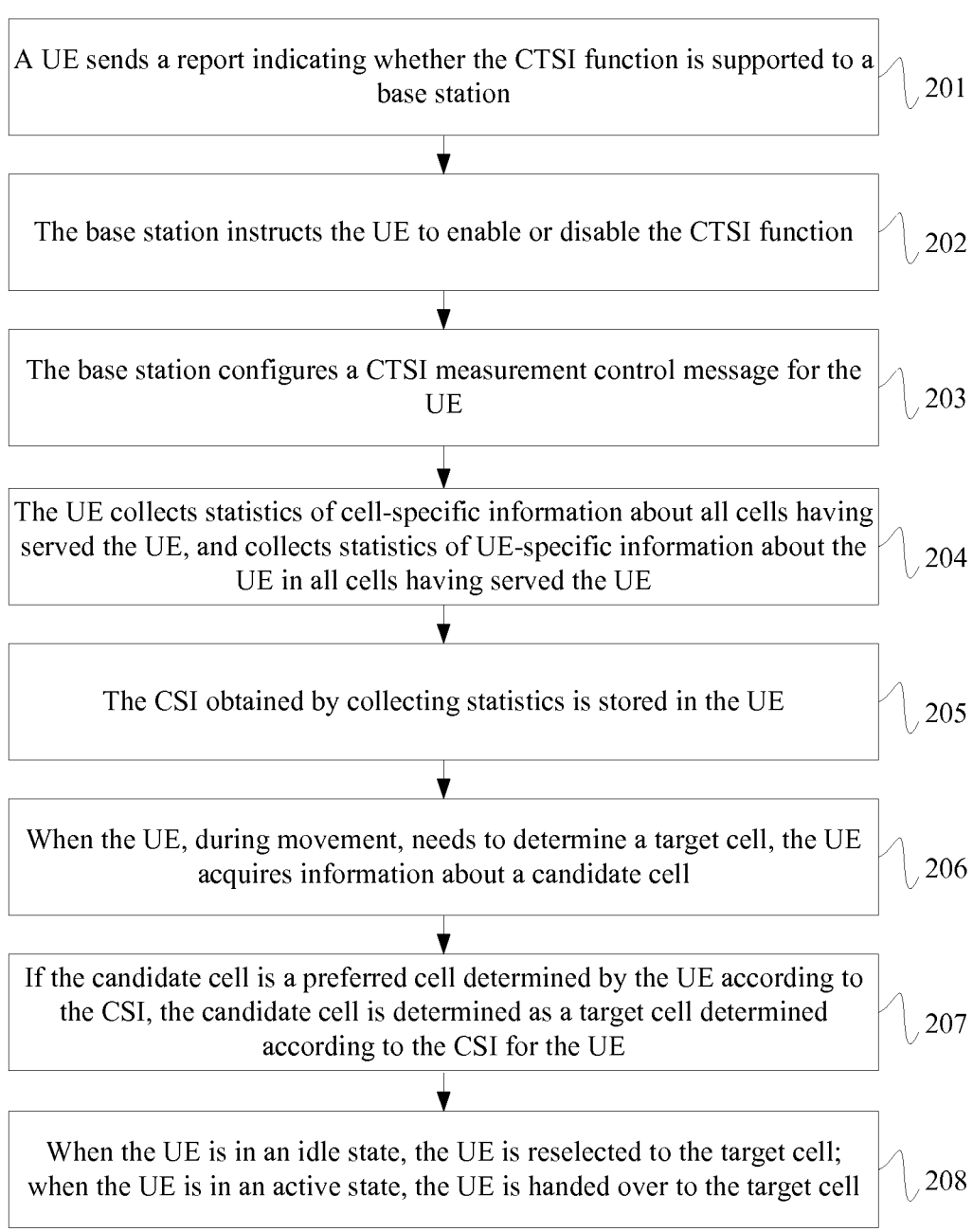
FIG. 2 is a flowchart of a method for determining a target cell according to a second embodiment of the present invention.

FIG. 2 is a flowchart of a method for determining a target cell according an embodiment of the present invention. As shown in FIG. 2, this embodiment uses a UE obtaining CSI as an example to describe in detail the method for determining a target cell. The method includes:

Optional step 201: A UE sends a report indicating whether a CSI function is supported to a base station.

Optional step 202: The base station instructs the UE to enable or disable the CSI function.

The base station may instruct, by using an RRC connection reconfiguration message, the UE to enable or disable the CSI function.

Optional step 203: The base station configures a CSI measurement control message for the UE.

The base station may configure the CSI measurement control message for the UE by using the RRC connection reconfiguration message.

Step 204: The UE collects statistics of cell-specific information about all cells having served the UE, and collects statistics of UE-specific information about the UE in all cells having served the UE.

When the UE collects statistics of the CSI including the cell-specific information about all cells having served the UE, and the UE-specific information about the UE in all cells having served the UE, the UE may be either in an idle state (Idle state), or in an active state (Active state). Preferably, the UE is in the idle state, because the UE in the idle state does not depend on an RRC connection established between the UE and a network, thereby achieving a power saving effect. However, if the UE needs to stay in the active state and cross a plurality of cells for normal service processing, to ensure that the collected and recorded information is contiguous and complete, the UE may also collect the CSI information in the active state. Certainly, when the UE in the active state collects statistics of the CSI, the UE may also collect statistics of parameters in the active state. For details about the parameters, reference may be made to parameter description in Tables 1 and 2.

Step 205: The CSI obtained by collecting statistics is stored in the UE.

The CSI may be all stored or partially stored, or the UE-specific information and the cell-specific information may be separately stored. The specific storage mode may be described as follows. Preferably, the obtained CSI is stored in sequence according to the sequence of cells accessed by the UE.

(1) Complete linked list form. That is, the cells are arranged in series by using a unidirectional and bidirectional linked list. Each unit in the linked list indicates CSI information of a cell. The sequence of the cells in the linked list may be the sequence of cells accessed by the UE. Table 3 shows a linked list of accessed cells and Table 4 shows CSI information.

TABLE 3

| Cell identifier |
|---|
| Cell 1 |
| Cell 2 |
| ... |
| Cell N |

TABLE 4

| Cell identifier | Cell-specific information | UE-specific information |
|---|---|---|
| Cell 1 | Cell 1-specific information | UE-specific information in cell 1 |
| Cell 2 | Cell 2-specific information | UE-specific information in cell 2 |
| ... | ... | ... |
| Cell N | Cell N-specific information | UE-specific information in cell N |

(2) The CSI may also be stored in a manner of category-based information storage. For example, the CSI is categorized according to a CSI parameter and the information is stored. For example, the CSI may be categorized according to the length of dwell time, that is, the dwell time is categorized into long-time dwell, normal dwell, and short-time dwell; during storage of the CSI, according to requirements, all or partial categories are respectively stored. The advantage of doing this is that storage space is reduced according to actual requirements. Other categories are not detailed herein. For example, category-based storage may also be performed according to cell type and cell power information.

TABLE 5

| Long-time dwell | Cell 2, Cell 10, . . . |
| Normal dwell | Cell 3, Cell 5, . . . |
| Short-time dwell | Cell 4, Cell 6, . . . |

(3) The CSI may also be stored in a manner of ranking-based information storage. For example, a dimension is selected to rank the CSI and the CSI is stored according to the ranking. For example, the CSI in five cells with the longest dwell time is stored. In this way, storage space is also reduced. Table 6 is a ranking table and Table 7 lists the CSI.

TABLE 6

| Ranking (Cell identifier) |
| --- |
| Cell 2 |
| Cell 1 |
| Cell 3 |
| Cell 5 |
| Cell 4 |

TABLE 7

| Cell identifier | Cell-specific information | UE-specific information |
| --- | --- | --- |
| Cell 2 | Cell 2-specific information | UE-specific information in cell 2 |
| Cell 1 | Cell 1-specific information | UE-specific information in cell 1 |
| Cell 3 | Cell 3-specific information | UE-specific information in cell 3 |
| Cell 5 | Cell 5-specific information | UE-specific information in cell 5 |
| Cell 4 | Cell 4-specific information | UE-specific information in cell 4 |

(4) The manner for storing the CSI may also be autonomously determined by the UE. For example, the UE may autonomously decide to selectively store the CSI of some cells, which are contiguous or non-contiguous. For example, the UE may store the CSI of some low-power node cells where the UE frequently camps.

Step 206: When the UE, during movement, needs to determine a target cell, the UE acquires information about a candidate cell.

The candidate cell is a cell satisfying a cell handover/reselection signal condition, and information about the candidate cell may be a cell identifier.

Step 207: If the candidate cell is a preferred cell determined by the UE according to the CSI, the candidate cell is determined as a target cell for the UE; if the candidate cell is an excluded cell determined by the UE according to the CSI, the candidate cell is excluded from being a target cell.

The UE may determine a preferred cell or an excluded cell according to one or more parameters in the CSI. When the CSI includes a cell identifier of a cell having served the UE and dwell time of the UE in the cell having served the UE, the determining the preferred/excluded cell may be implemented by the UE by: determining, according to the cell identifier of the candidate cell and the CSI, whether the dwell time of the UE in the candidate cell satisfies a threshold of a preferred cell/excluded cell; and if the candidate cell satisfies the threshold, determining the candidate cell as a preferred/excluded cell.

The threshold herein may be understood as either a specific time value or an identifier denoting a different meaning. For example, when the dwell time in the CSI denotes a specific time value, a specific time value may be set as the threshold. For example, if the threshold of a preferred cell is eight hours, regardless of working or rest, the time of staying at a company or at home should exceed eight hours. It is a preferred manner to set the specific time value eight hours as the threshold. The threshold of an excluded cell is five minutes, indicating cells that are quickly passed through and excluded. When the dwell time in the CSI represents the length of the dwell time, an identifier may be set as the threshold. For example, the threshold of a preferred cell is a long-time dwell, the threshold of an excluded cell is a short-time dwell, and the like.

With regard to the case where the candidate cell is an excluded cell, the reselection of a target cell or handover to a target cell will not be performed. This effectively reduces unnecessary reselections or handovers, thereby saving network resources.

Certainly, this embodiment uses the dwell time as an example to describe that a preferred/excluded cell may be determined according to all types of information in the CSI. For example:

(1) Dwell time: With regard to a UE having entered a specific cell and dwelled in the cell for a long period of time, if it can be predicated that the UE will dwell in the cell for a long period of time, a selection/reselection/handover is made to this cell as far as possible so that the cell provides services for the UE. Correspondingly, subsequent services are initiated from the cell. In this way, the low-power cells are fully used to increase system capacity and implement a selection/reselection/handover to the cell in advance. With regard to a UE having entered a specific cell but dwelled in the cell for a short period of time, if it can be predicated that the UE will dwell in the cell for a short period of time, a selection/reselection/handover is not made to the cell as far as possible so that the cell does not provide services for the UE. Correspondingly, subsequent services are not initiated from the cell. In this way, unnecessary cell selection/reselection/handover processes are reduced to reduce signaling interaction and processing on the device. Meanwhile, because cell selection/reselection/handover attempts are reduced, the possibilities of selection/reselection/handover failures are reduced.

(2) Service experience: A cell having a good historical service experience statistical result may be used as a high-priority cell for a cell selection/reselection/handover; and a cell having a poor historical service experience statistical result may be used as a low-priority cell for a cell selection/reselection/handover. This may improve quality of the cell selection/reselection/handover.

(3) Access time: The time when a UE enters/leaves a cell is collected. The UE may compare the collected access time with the current time to determine whether regularity is satisfied, which serves as input reference for deciding whether to apply other CSI parameters.

(4) Speed: For a UE, a cell where the UE has had a lower speed may be used as a high-priority cell for a cell selection/reselection/handover, and a cell where the UE has had a higher speed may be used as a low-priority cell for a cell selection/reselection/handover. Because a high speed indicates that the UE will quickly leave a cell, and especially a low-power cell, that is, another selection/reselection/handover will occur.

It should be noted that a candidate cell may also be determined as a target cell by using the following operation: adding a preset offset for the target cell. Using the dwell time in the CSI as an example, a UE may select a cell allowing a long-time dwell from cells satisfying signal conditions as a target cell, or may add a cell reselection/handover offset for the cell allowing a long-time dwell. Using the cell type in the CSI as an example, the UE may select a Pico cell from cells satisfying the signal conditions as a target cell, or may add a cell reselection/handover offset for the Pico cell. Using the cell power information in the CSI as an example, the UE may preferentially select a low-power cell from cells satisfying the signal conditions as a target cell when the current serving cell is a macro cell, or may add a cell reselection/handover offset for the low-power cell when the current serving cell is a macro cell. For example, a target cell may be selected with reference to the dwell time and cell power information. That is, the UE may select a low-power cell allowing a long-time dwell from cells satisfying the signal conditions as a target cell, or may add a cell reselection/handover offset for the low-power cell allowing a long-time dwell. This avoids unnecessary reselections/selections/handovers, and improves the speed of selecting a cell for a long-time dwell.

Step 208: When the UE is in an idle state, the UE is reselected to the target cell; when the UE is in an active state, the UE is handed over to the target cell.

The specific selection/reselection/handover process can be implemented according to the prior art, and details are omitted herein.

It should be supplemented that when a UE detects that the UE approaches a low-power cell in the CSI, the UE may actively send a proximity indication to a network side device, for instructing the network side device to reselect/hand over the UE to the approached low-power cell. The term "proximity" may be understood as follows: When a UE enters or leaves a CSG cell, and the CSG ID is in the white-list of the UE, the UE sends a proximity indication message to the network side device. Proximity detection is based on an autonomous search function of the UE. The autonomous search function of the UE is implemented by the UE, which determines when and where to search for an access-allowed CSG cell.

For example, using the dwell time and location information as an example, when the UE approaches a cell allowing a long-time dwell, the UE sends an indication to the network side device to notify that the UE approaches a cell allowing a long-time dwell.

For example, using the dwell time, location information, and cell type as an example, when the UE approaches a Pico cell allowing a long-time dwell, the UE sends an indication to the network side device to notify that the UE approaches a Pico cell allowing a long-time dwell.

Figure 3:
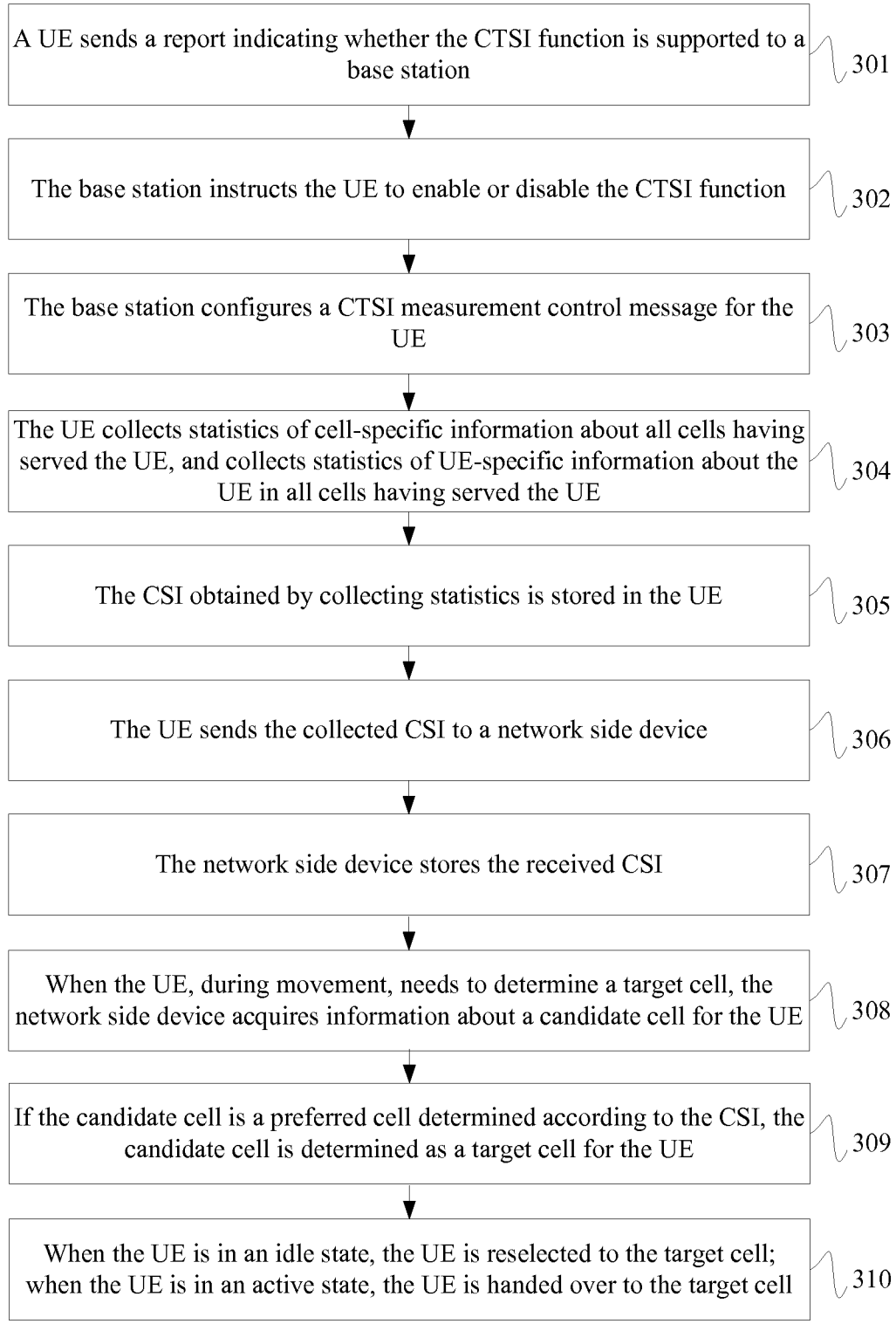
FIG. 3 is a flowchart of a method for determining a target cell according to a third embodiment of the present invention.

For example, using the dwell time, location information, and cell power information as an example, when the UE approaches a low-power cell allowing a long-time dwell, the UE sends an indication to the network side device to notify that the UE approaches a low-power cell allowing a long-time dwell FIG. 3 is a flowchart of a method for determining a target cell according an embodiment of the present invention. As shown in FIG. 3, this embodiment uses a process in which a UE obtains CSI and sends the CSI to a network side device, and the network side device performs a cell selection/reselection/handover as an example to describe in detail the method for determining a target cell. The method includes the following:

For details about steps 301 to 305, reference may be made to steps 201 to 205 in the above embodiment, and repeated description is not provided herein.

Step 306: The UE sends the collected CSI to the network side device.

The network side device may be a base station, a core network device, and the like.

The sent CSI may be partial or all CSI obtained by the UE. The partial CSI refers to a part of CSI selected by the UE for sending, where a serving cell corresponding to the partial CSI may use such CSI for reference for the ongoing or upcoming selection/reselection/handover. All CSI refers to all CSI obtained by the UE, where a part of the information may not be used immediately, but may be used for reference for the subsequent method. Whether to send partial or all CSI depends on the control of the network or may be autonomously decided by the UE. When whether to send partial or all CSI depends on the control of the network, the network side device needs to send an indication to the UE.

The CSI may be sent in the following manners:

Event triggering: A measurement event of the UE triggers the UE to send the CSI to the network side device. The CSI is sent in a measurement report message.

Periodic report: A period is set for the UE. For example, the CSI is sent every other day. Because the CSI is relatively stable, by using the set period, an operator can control increase of traffic caused by sending the CSI.

Dedicated signaling notification: New dedicated signaling is introduced, and the UE is requested to immediately send the CSI as required by the network side device.

CSI update: When a CSI update is detected, the UE sends the update of the CSI or updated CSI to the network side device.

Step 307: The network side device stores the received CSI.

For details about the storage manner, reference may be made to step 205 in the second embodiment, and repeated description is not provided herein.

Step 308: When the UE, during movement, needs to determine a target cell, the network side device acquires information about a candidate cell for the UE.

The candidate cell is a cell satisfying a cell handover/reselection signal condition, and information about the candidate cell may be a cell identifier.

Step 309: If the candidate cell is a preferred cell determined according to the CSI, the candidate cell is determined as a target cell for the UE; if the candidate cell is an excluded cell determined according to the CSI, the candidate cell is excluded from being a target cell.

It should be noted that a candidate cell may also be determined as a target cell by using the following operation:

adding a preset offset for a specific cell according to the CSI information. Using the dwell time in the CSI as an example, a network side device may select a cell allowing a long-time dwell from cells satisfying signal conditions as a target cell, or may add an offset for the cell allowing a long-time dwell. For example, a target cell may be selected with reference to the dwell time and cell power information. That is, the network side device may select a low-power cell allowing a long-time dwell from cells satisfying the signal conditions as a target cell, or may add an offset for the low-power cell allowing a long-time dwell. This avoids unnecessary selections/reselections/handovers, and a selection/reselection/handover is made in advance to the cell allowing a long-time dwell.

In this embodiment, a preferred/excluded cell may be determined according to all types of information in the CSI. For example:

(1) Dwell time: With regard to a UE having entered a specific cell and dwelled in the cell for a long period of time, if it can be predicated that the UE will dwell in the cell for a long period of time, a handover is made to this cell as far as possible so that the cell provides services for the UE. Correspondingly, subsequent services are initiated from the cell. In this way, the low-power cells are fully used to increase system capacity and implement a handover to the cell in advance. With regard to a UE having entered a specific cell but dwelled in the cell for a short period of time, if it can be predicated that the UE will dwell in the cell for a short period of time, a handover is not made to the cell as far as possible so that the cell does not provide services for the UE. Correspondingly, subsequent services are not initiated from the cell. In this way, unnecessary cell handover processes are reduced to reduce handover signaling and processing on the device. Meanwhile, because cell handover attempts are reduced, the possibilities of handover failures are reduced.

(2) Service experience: A cell having a good historical service experience statistical result may be used as a high-priority target cell for a handover; and a cell having a poor historical service experience statistical result may be used as a low-priority target cell for a handover. This may improve quality of the handover to the target cell.

(3) Access time: The time when a UE enters/leaves a cell is collected. For a base station, a handover may be optimized according to the access time. For example, after access time of a large number of UEs is collected, a peak period of accessing the cell may be calculated. To be specific, after all access time is obtained, if the number of UEs at specific access time (for example, accurate to one minute or 10 minutes) exceeds a preset value, the base station determines that at the access time, a heavy load will occur and therefore the original UEs under the base station are handed over to another cell before arrival of the peak period to release more resources to accommodate the upcoming heavy load. In addition, a cause value is used to indicate the upcoming heavy load to the handover target cell so that the target cell preferentially admits the UEs that are handed over.

(4) Speed: For a UE, a cell where the UE has had a lower speed may be used as a high-priority cell for a cell handover, and a cell where the UE has had a higher speed may be used as a low-priority cell for a cell handover. Because a high speed indicates that the UE will quickly leave a cell, and especially a low-power cell, that is, another handover will occur.

(5) Handover result or success rate information: A cell having a good historical handover statistical result may be used as a high-priority cell for a handover, and a cell having a poor historical handover statistical result may be used as a low-priority cell for a handover. This may improve reliability of the handover. For example, a cell having a handover success rate higher than a preset value is considered as a cell having a good handover result or a high success rate; otherwise, the cell is considered as a cell having a poor handover result or a low success rate. The preferential handover may be specifically implemented by selecting a cell having a good handover result from cells satisfying the measurement result, or adding a preset offset for a cell having a good handover result or a high success rate based on the measurement result.

(6) Direction: The direction may be compared with the time and direction of entering and leaving the cell, or the network may be optimized according to this information. For example, after the access time of a large number of UEs is collected, the peak hour after work may be identified, and thereby cells that a large number UEs are handed over to or handed over from are detected.

Step 310: When the UE is in an idle state, the UE is reselected to the target cell.

When the UE is in an active state, the UE is handed over to the target cell.

The specific selection/reselection/handover process can be implemented according to the prior art, and details are omitted herein.

Figure 4:
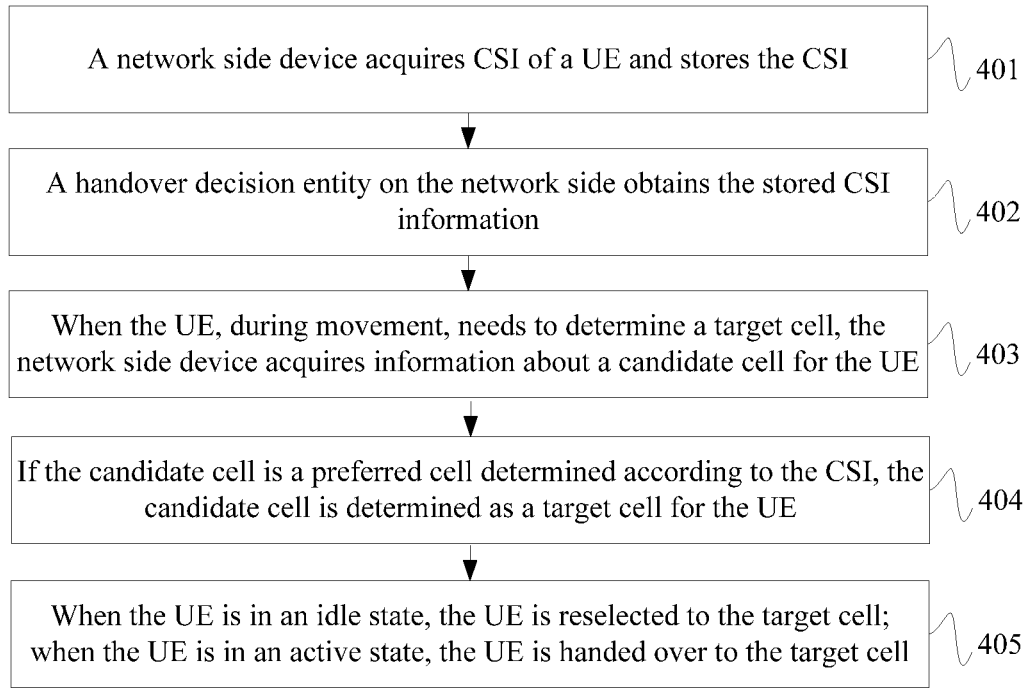
FIG. 4 is a flowchart of a method for determining a target cell according to a fourth embodiment of the present invention.

FIG. 4 is a flowchart of a method for determining a target cell according an embodiment of the present invention. As shown in FIG. 4, this embodiment uses a network side device obtaining CSI as an example to describe in detail the method for determining a target cell. The method includes:

Step 401: A network side device acquires CSI of a UE and stores the CSI.

The network side device may be a base station, an operation and maintenance system (Operations And Maintenance, hereafter abbreviated as OAM), or a core network node (for example, a serving GPRS support node (Serving GPRS Support Node, hereafter abbreviated as SGSN, a mobility management element (Mobility Management Entity, abbreviated as MME), a home location register (Home Location Register, abbreviated as HLR), or a subscriber database (Home Subscriber Server, abbreviated as HSS)). The network side device is preferably a core network node. Using an MME as an example, the specific method for acquiring the CSI of the UE may include:

Manner 1: During the completion stage of the handover process, handover-related messages of a radio access network (Radio Access Network, hereafter abbreviated as RAN) and a core network are used to carry the CSI information to an MME. For example, in an LTE X2 handover, the CSI is reported in a Path Switch (Path Switch) message reported by an eNB to the MME; and in an LTE S1 handover, the CSI is reported in a Handover Notify (Handover Notify) message reported by the eNB to the MME.

Manner 2: When the UE completes services and the network releases the connection of the UE, the CSI information is carried in messages of the RAN and the core network. For example, in an LTE system, the CSI may be carried in a Context Release Complete (CONTEXT RELEASE COMPLETE) or UE Context Release Request (CONTEXT RELEASE REQUEST) message to the MME. After obtaining the CSI information, a core network node may further transfer the CSI information to other core network nodes for storage so that the CSI information is managed in a centralized manner. For example, the CSI information is stored in a home subscriber server, a home location register, or an OAM server, and obtained by a request using signaling.

Manner 3: When the CSI is updated, the update of the CSI or all the updated CSI is acquired. It should be noted that the advantage of storing the CSI by a network side device lies in that the CSI can be acquired in advance, air interface processes are reduced, and delay is shortened.

Step 402: A handover decision entity on the network side obtains the stored CSI information.

For example, in an LTE system, the handover decision entity is located in a base station, and if the CSI information is stored in an MME, the CSI information may be obtained by using signaling between the base station and the MME. The handover decision entity on the network side may also be carried by a resource base station to a current base station when the UE is handed over to the current base station.

Step 403: When the UE, during movement, needs to determine a target cell, the network side device acquires information about a candidate cell for the UE.

The candidate cell is a cell satisfying a cell handover/reselection signal condition, and information about the candidate cell may be a cell identifier.

Step 404: If the candidate cell is a preferred cell determined according to the CSI, the candidate cell is determined as a target cell for the UE; if the candidate cell is an excluded cell determined according to the CSI, the candidate cell is excluded from being a target cell.

The network side device may select a handover target cell according to one or more parameters in the received CSI. The method for selecting a handover target cell is specifically selecting, according to the CSI information, a handover target cell from cells satisfying signal conditions, or adding a preset offset for a specific cell according to the CSI information. Using the dwell time in the CSI as an example, a UE may select a cell allowing a long-time dwell from cells satisfying signal conditions as a handover target cell, and a network side device may add a cell offset for the cell allowing a long-time dwell. For example, a handover target cell may be selected with reference to the dwell time and cell power information. That is, the network side device may select a low-power cell allowing a long-time dwell from cells satisfying the signal conditions as a handover target cell, or may add an offset for the low-power cell allowing a long-time dwell. This avoids unnecessary handovers, and implements a handover to the cell for a long-time dwell in advance.

In this embodiment, a preferred/excluded cell may be determined according to all types of information in the CSI. For example:

(1) Dwell time: With regard to a UE having entered a specific cell and dwelled in the cell for a long period of time, if it can be predicated that the UE will dwell in the cell for a long period of time, a handover is made to this cell as far as possible so that the cell provides services for the UE. Correspondingly, subsequent services are initiated from the cell. In this way, the low-power cells are fully used to increase system capacity and implement a handover to the cell in advance. With regard to a UE having entered a specific cell but dwelled in the cell for a short period of time, if it can be predicated that the UE will dwell in the cell for a short period of time, a handover is not made to the cell as far as possible so that the cell does not provide services for the UE. Correspondingly, subsequent services are not initiated from the cell. In this way, unnecessary cell handover processes are reduced to reduce handover signaling interaction and processing on the device. Meanwhile, because cell handover attempts are reduced, the possibilities of handover failures are reduced.

(2) Service experience: A cell having a good historical service experience statistical result may be used as a high-priority target cell for a handover; and a cell having a poor historical service experience statistical result may be used as a low-priority target cell for a handover. This may improve quality of the handover to the target cell.

(3) Access time: The time when a UE enters/leaves a cell is collected. The UE may compare the collected access time with the current time to determine whether regularity is satisfied, which may serve as input reference for deciding whether to apply other CSI parameters. A base station may optimize the handover according to the information. For example, after access time of a large number of UEs is collected, a peak period of accessing the cell may be calculated. To be specific, after all access time is obtained, if the number of UEs at specific access time (for example, accurate to one minute or 10 minutes) exceeds a preset value, the base station determines that at the access time, a heavy load will occur and therefore the original UEs under the base station are handed over to another cell before arrival of the peak period to release more resources to accommodate the upcoming heavy load. In addition, a cause value is used to indicate the upcoming heavy load to the handover target cell so that the target cell preferentially admits the UEs that are handed over.

(4) Speed: For a UE, a cell where the UE has had a lower speed may be used as a high-priority cell for a cell handover, and a cell where the UE has had a higher speed may be used as a low-priority cell for a cell handover. Because a high speed indicates that the UE will quickly leave a cell, and especially a low-power cell, that is, another handover will occur.

(5) Handover result or success rate information: A cell having a good historical handover statistical result may be used as a high-priority cell for a handover, and a cell having a poor historical handover statistical result may be used as a low-priority cell for a handover. This may improve reliability of the handover. For example, a cell having a handover success rate higher than a preset value is considered as a cell having a good handover result or a high success rate; otherwise, the cell is considered as a cell having a poor handover result or a low success rate. The preferential handover may be specifically implemented by selecting a cell having a good handover result from cells satisfying the measurement result, or adding a preset offset for a cell having a good handover result or a high success rate based on the measurement result.

(6) Direction: The direction may be compared with the time and direction of entering and leaving the cell, or the network may be optimized according to this information. For example, after the access time of a large number of UEs is collected, the peak hours for work and after work may be identified, and thereby cells that a large number UEs are handed over to or handed over from are detected.

Using the dwell time in the CSI as an example, the network side device may select a cell with a longest dwell time in the CSI from multiple candidate serving cells as a target cell, to prevent waste and service interruptions caused by unnecessary handovers.

Step 405: When the UE is in an idle state, the UE is reselected to the target cell; when the UE is in an active state, the UE is handed over to the target cell.

The specific reselection/handover process can be implemented according to the prior art, and details are omitted herein.

Figure 5:
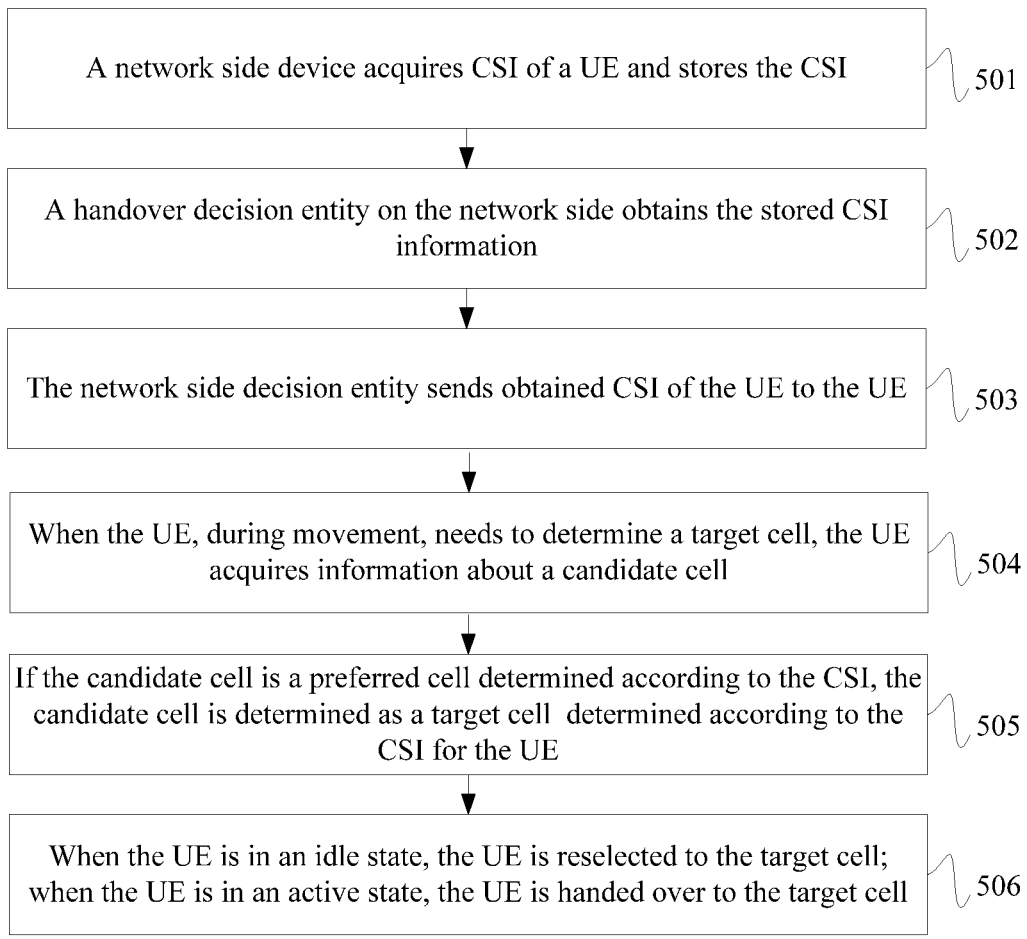
FIG. 5 is a flowchart of a method for determining a target cell according to a fifth embodiment of the present invention.

FIG. 5 is a flowchart of a method for determining a target cell according an embodiment of the present invention. As shown in FIG. 5, this embodiment uses a network side device obtaining CSI and sending the CSI to a UE as an example to describe in detail the method for determining a target cell. The method includes the following:

For details about steps 501 to 502, reference may be made to steps 401 to 402 in the above embodiment, and repeated description is not provided herein.

Step 503: The network side decision entity sends obtained CSI of the UE to the UE.

The network side device may send the CSI in an RRC connection setup message, an RRC connection reconfiguration message, or a NAS message.

For details about steps 504 to 506, reference may be made to steps 206 to 208 in the above embodiment, and repeated description is not provided herein.

In conclusion, by obtaining candidate cell information and determining a target cell according to CSI information, a network side device and a UE are both capable of performing a proper reselection/handover according to the CSI information, thereby avoiding unnecessary handovers or reselections. For example, when it is predicted that a UE quickly traverses specific cells, the UE may not be handed over or reselected to these cells but are maintained in the micro network. Effective reduction of the number of handovers/reselections reduces the number of service interruptions, especially for delay-sensitive services, and enhances user experience. Meanwhile, with the reduction of the number of handovers, because the handover success rate is a definite value, the number of latent handover failures is relatively reduced. With regard to a mobile terminal, during a cell selection/reselection, by fully considering the CSI, the mobile terminal is prevented from accessing a cell allowing a short-time dwell, thereby avoiding waste of resources caused by frequent selections/reselections and the like. In this way, the resources of the cell are reserved for the mobile terminals camping on the cell for a long period of time. In addition, low-power nodes are selected for camping, thereby fully using the node resources and increasing the network system capacity. If the CSI is stored according to the movement track of the mobile terminal, a next cell where the mobile terminal is to move may be acquired in advance according to the CSI, and behaviors and information about the mobile terminal in the next cell may also be acquired in advance. In this way, the handover/reselection/selection is optimized according to the information.

Figure 6:
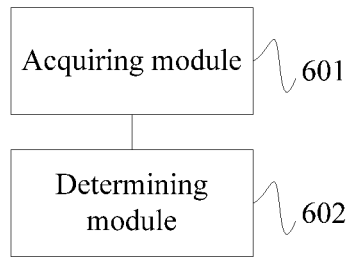
FIG. 6 is a schematic structural diagram of a mobile terminal according to a sixth embodiment of the present invention.

An embodiment of the present invention further provides a mobile terminal, as shown in FIG. 6. FIG. 6 is a schematic structural diagram of the mobile terminal according to a sixth embodiment of the present invention. The mobile terminal is a specific executor of the above method embodiments. Therefore, the content in the method embodiments is incorporated by reference in this embodiment. The mobile terminal includes: an acquiring module 601 and a determining module 602. The acquiring module 601 is configured to acquire information about a candidate cell. The determining module 602 is configured to determine the candidate cell as a target cell if the candidate cell acquired by the acquiring module 601 is a preferred cell determined according to cell statistic information, where the cell statistic information includes: specific information about a cell having served the mobile terminal and specific information about the mobile terminal in the cell having served the mobile terminal.

Figure 7:
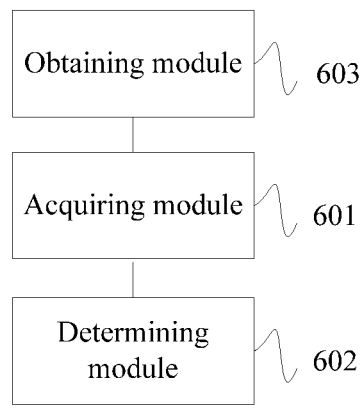
FIG. 7 is a schematic structural diagram of a mobile terminal according to a seventh embodiment of the present invention.

In the above-mentioned embodiment, in an implementation mode, the mobile terminal may further include: an obtaining module 603, as illustrated in a second schematic structural diagram shown in FIG. 7. The obtaining module 603 is configured to obtain the cell statistic information. The obtaining module 603 includes a recording unit. The recording unit is configured to record the specific information about the cell having served the mobile terminal, and the specific information about the mobile terminal in the cell having served the mobile terminal.

Figure 8:
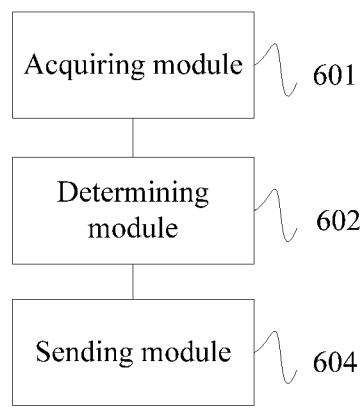
FIG. 8 is a schematic structural diagram of a mobile terminal according to an eighth embodiment of the present invention.

In the above-mentioned embodiment, in an implementation mode, the mobile terminal may further include: a sending module 604, as illustrated in a third schematic structural diagram shown in FIG. 8. The sending module 604 is configured to send the cell statistic information obtained by the obtaining module 603 to a network side device.

In the above-mentioned embodiment, the cell statistic information includes at least a cell identifier of the cell having served the mobile terminal and dwell time of the mobile terminal in the cell having served the mobile terminal; and the determining module 602 includes a first determining unit. The first determining unit is configured to: determine, by using the cell identifier of the candidate cell and the cell statistic information, whether the dwell time of the mobile terminal in the candidate cell satisfies a threshold of a preferred cell; and if the dwell time satisfies the threshold, determine the candidate cell as the preferred cell.

In the above-mentioned embodiment, the cell statistic information includes at least a cell identifier of the cell having served the mobile terminal and dwell time of the mobile terminal in the cell having served the mobile terminal; and the determining module 602 includes a second determining unit. The second determining unit is configured to: determine, by using the cell identifier of the candidate cell and the cell statistic information, whether the dwell time of the mobile terminal in the candidate cell satisfies a threshold of an excluded cell; and if the dwell time satisfies the threshold, determine the candidate cell as the excluded cell.

Figure 9:
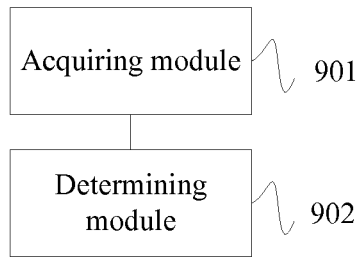
FIG. 9 is a schematic structural diagram of a network side device according to a ninth embodiment of the present invention.

An embodiment of the present invention further provides a network side device. The network side device is a specific executor of the above method embodiments. Therefore, the content in the method embodiments is incorporated by reference in this embodiment. FIG. 9 is a schematic structural diagram of a network side device according to an embodiment of the present invention. As shown in FIG. 9, the network side device includes: an acquiring module 901 and a determining module 902. The acquiring module 901 is configured to acquire information about a candidate cell for a mobile terminal; and the determining module 902 is configured to determine the candidate cell as a target cell for the mobile terminal if the candidate cell acquired by the acquiring module 901 is a preferred cell determined according to cell statistic information. The cell statistic information includes: specific information about a cell having served the mobile terminal and specific information about the mobile terminal in the cell having served the mobile terminal.

Figure 10:
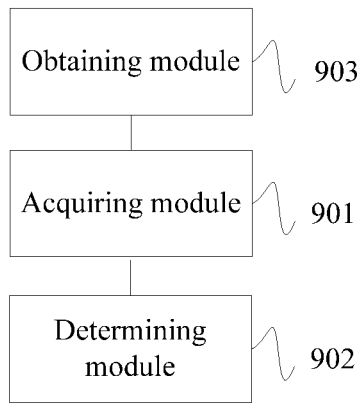
FIG. 10 is a second schematic structural diagram of a network side device according to a tenth embodiment of the present invention.

In the above-mentioned embodiment, in an implementation mode, the network side device further includes: an obtaining module 903. FIG. 10 is a second schematic structural diagram of a network side device according to an embodiment of the present invention. The obtaining module 903 is configured to obtain the specific information about the cell having served the mobile terminal and the specific information about the mobile terminal in the cell having served the mobile terminal, from a core network or an operation and maintenance system and/or in a call establishment process of the mobile terminal.

Figure 11:
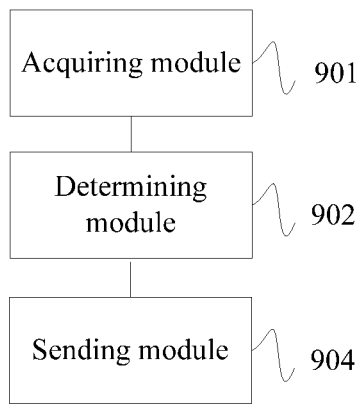
FIG. 11 is a third schematic structural diagram of a network side device according to an eleventh embodiment of the present invention.

In the above-mentioned embodiment, in an implementation mode, the network side device further includes: a sending module 904. FIG. 11 is a third schematic structural diagram of a network side device according to an embodiment of the present invention. The sending module 904 is configured to send the cell statistic information obtained by the obtaining module 903 to the mobile terminal.

In the above-mentioned embodiment, in an implementation mode, the determining module 902 may be further configured to exclude the candidate cell from being a target cell if the candidate cell is an excluded cell determined according to the cell statistic information.

Figure 12:
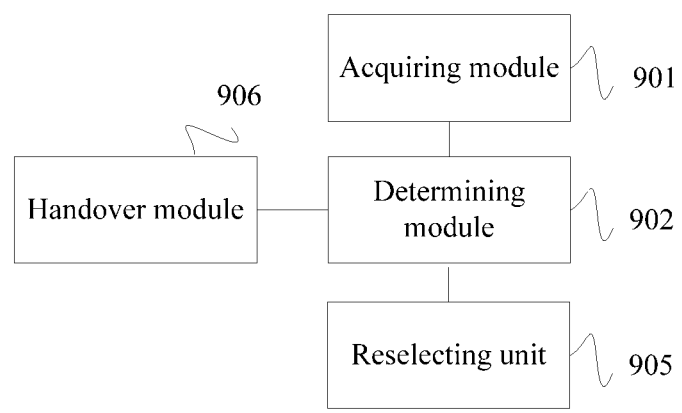
FIG. 12 is a fourth schematic structural diagram of a network side device according to a twelfth embodiment of the present invention.

In the above-mentioned embodiment, in an implementation mode, the network side device further includes: a reselecting module 905 and/or a handover module 906. FIG. 12 is a fourth schematic structural diagram of a network side device according to an embodiment of the present invention. The reselecting module 905 is configured to reselect the mobile terminal to the target cell determined by the determining module 902, when the mobile terminal is in an idle state. The handover module 906 is configured to hand over the mobile terminal to the target cell determined by the determining module 902, when the mobile terminal is in an active state.

The device provided in the embodiments of the present invention acquires information about a candidate cell for a mobile terminal, determines whether the candidate cell is a preferred cell determined according to cell statistic information, and if so, determines the candidate cell as a target cell for the mobile terminal; where the cell statistic information includes specific information about the cell having served the mobile terminal, and specific information about the mobile terminal in the cell having served the mobile terminal. The device for determining a target cell according to the cell statistic information effectively prevents the mobile terminal from being blindly handed over or reselected to any candidate cell, thereby saving network resources and additionally providing more stable and reliable services for users.

Persons of ordinary skill in the art may understand that all or part of the steps of the methods in the embodiments may be implemented by a program instructing relevant hardware. The program may be stored in a computer readable storage medium. When the program is run, the foregoing steps of the methods in the embodiments are performed. The storage medium may be any medium capable of storing program codes, such as a ROM, a RAM, a magnetic disk, or an optical disk.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solution described in the foregoing embodiments or make equivalent replacements to some technical features thereof, without departing from the spirit and scope of the technical solution of the embodiments of the present invention.

What is claimed is:

1. A method for determining a target cell, comprising:
    acquiring information about a candidate cell for a mobile terminal; and
    determining the candidate cell as a target cell for the mobile terminal if the candidate cell is a preferred cell determined according to cell statistic information,
    wherein the cell statistic information comprises: information about a cell having served the mobile terminal and information about the mobile terminal in the cell having served the mobile terminal;
    wherein before the acquiring information about a candidate cell for a mobile terminal, the method further comprises: obtaining, by the mobile terminal, the cell statistic information;
    wherein the obtaining, by the mobile terminal, the cell statistic information comprises:
    recording, by the mobile terminal, the information about the cell having served the mobile terminal, and the information about the mobile terminal in the cell having served the mobile terminal.

2. The method according to claim 1, further comprising:
    sending, by the mobile terminal, the cell statistic information to a network side device.

3. The method according to claim 1, wherein before the acquiring information about a candidate cell for a mobile terminal, the method further comprises: obtaining, by a network side device, the cell statistic information;
    wherein the obtaining, by the network device, the cell statistic information comprises:
    obtaining, by the network side device, the information about the cell having served the mobile terminal and the information about the mobile terminal in the cell having served the mobile terminal, from a core network or an operation and maintenance system and/or in a call establishment process of the mobile terminal.

4. The method according to claim 3, further comprising:
    sending, by the network side device, the cell statistic information to the mobile terminal.

5. The method according to claim 1, wherein the cell statistic information comprises at least a cell identifier of the cell having served the mobile terminal and dwell time of the mobile terminal in the cell having served the mobile terminal;
    wherein determining the preferred cell according to cell statistic information comprises:
    determining, by using the cell identifier of the candidate cell and the cell statistic information, whether the dwell time of the mobile terminal in the candidate cell satisfies a threshold of the preferred cell; and if the dwell time satisfies the threshold, determining the candidate cell as the preferred cell.

6. The method according to claim 1, further comprising:
    excluding the candidate cell from being a target cell if the candidate cell is an excluded cell determined according to the cell statistic information.

7. The method according to claim 6, wherein the cell statistic information comprises at least a cell identifier of the cell having served the mobile terminal and dwell time of the mobile terminal in the cell having served the mobile terminal;
    the method for determining an excluded cell according to the cell statistic information comprises:
    determining, by using the cell identifier of the candidate cell and the cell statistic information, whether the dwell time of the mobile terminal in the candidate cell satisfies a threshold of an excluded cell; and if the dwell time satisfies the threshold, determining the candidate cell as the excluded cell.

8. The method according to claim 1, wherein after the determining the candidate cell as a target cell for the mobile terminal, the method further comprises:
    when the mobile terminal is in an idle state, reselecting the target cell for the mobile terminal; and
    when the mobile terminal is in an active state, handing over the mobile terminal to the target cell.

9. The method according to claim 1, wherein the information about the cell having served the mobile terminal in the cell statistic information further comprises:
    one or more of: a cell type, radio access information, frequency information, frequency priority information, a network planning related parameter, cell transmit power, cell location information, and radio access system information; and
    the information about the mobile terminal in the cell having served the mobile terminal in the cell statistic information further comprises:
    one or more of: handover result information, information about the cell desired for access, service experience, radio channel quality, access time, direction, speed, and subscriber profile identifier information for the mobile terminal.

10. A mobile terminal, comprising:
    a first receiver configured to acquire information about a candidate cell;
    a processor configured to determine the candidate cell as a target cell if the candidate cell acquired by the first receiver is a preferred cell determined according to cell statistic information,
    wherein the cell statistic information comprises: specific information about a cell having served the mobile terminal and information about the mobile terminal in the cell having served the mobile terminal;
    a second receiver configured to obtain the cell statistic information;
    wherein the second receiver comprises a recording unit, configured to record the specific information about the cell having served the mobile terminal and the information about the mobile terminal in the cell having served the mobile terminal.

11. The mobile terminal according to claim 10, further comprising a transmitter configured to send the cell statistic information obtained by the second receiver to a network side device.

12. The mobile terminal according to claim 10, wherein the cell statistic information comprises at least a cell identifier of the cell having served the mobile terminal and dwell time of the mobile terminal in the cell having served the mobile terminal; and the processor is configured to determine, by using the cell identifier of the candidate cell and the cell statistic information, whether the dwell time of the mobile terminal in the candidate cell satisfies a threshold of the preferred cell; and if the dwell time satisfies the threshold, determine the candidate cell as the preferred cell.

13. The mobile terminal according to claim 10, wherein the cell statistic information comprises at least a cell identifier of the cell having served the mobile terminal and dwell time of the mobile terminal in the cell having served the mobile terminal; and the processor is further configured to determine, by using the cell identifier of the candidate cell and the cell statistic information, whether the dwell time of the mobile terminal in the candidate cell satisfies a threshold of an excluded cell; and if the dwell time satisfies the threshold, determine the candidate cell as the excluded cell.

14. A network device, comprising:
a first receiver configured to acquire information about a candidate cell for a mobile terminal;
a processor configured to determine the candidate cell as a target cell for the mobile terminal if the candidate cell acquired by the first receiver is a preferred cell determined according to cell statistic information,
wherein the cell statistic information comprises: information about a cell having served the mobile terminal and information about the mobile terminal in the cell having served the mobile terminal;
a second receiver configured to obtain the information about the cell having served the mobile terminal and the information about the mobile terminal in the cell having served the mobile terminal, from a core network or an operation and maintenance system or in a call establishment process of the mobile terminal.

15. The network device according to claim 14, further comprising:
a transmitter configured to send the cell statistic information obtained by the second receiver to the mobile terminal.

16. The network device according to claim 14, wherein the processor is further configured to:
exclude the candidate cell from being a target cell if the candidate cell is an excluded cell determined according to the cell statistic information.

17. The network device according to claim 14, the processor is further configured to:
reselect the mobile terminal to the target cell when the mobile terminal is in an idle state; or
hand over the mobile terminal to the target cell when the mobile terminal is in an active state.

* * * * *